United States Patent [19]
Smith et al.

[11] Patent Number: 5,717,572
[45] Date of Patent: Feb. 10, 1998

[54] PASSIVELY COOLED DISPLAY DOOR

[75] Inventors: Grant M. Smith, Bryn Athyn; Peter P. Klein, Phoenixville, both of Pa.

[73] Assignee: Unisys Corporation, Blue Bell, Pa.

[21] Appl. No.: 389,110

[22] Filed: Feb. 15, 1995

[51] Int. Cl.$^6$ ................................................. H05K 7/20
[52] U.S. Cl. ................................................. 361/695; 361/687
[58] Field of Search .................... 165/104.33, 104.34; 361/687–688, 690–697, 724–725

[56] References Cited

U.S. PATENT DOCUMENTS

| | | | |
|---|---|---|---|
| 4,291,364 | 9/1981 | Andros et al. | 361/384 |
| 4,383,286 | 5/1983 | Hicks | 361/384 |
| 4,502,100 | 2/1985 | Greenspan et al. | 361/384 |
| 4,600,326 | 7/1986 | Fudatsuji et al. | 361/695 |
| 4,710,851 | 12/1987 | Pastecki | 361/384 |
| 4,744,005 | 5/1988 | Milani | 361/384 |
| 4,980,848 | 12/1990 | Griffin et al. | 361/688 |
| 5,107,398 | 4/1992 | Bailey | 361/384 |
| 5,136,464 | 8/1992 | Ohmori | 361/384 |
| 5,150,277 | 9/1992 | Bainbridge et al. | 361/384 |
| 5,263,537 | 11/1993 | Plucinski et al. | 165/97 |
| 5,297,005 | 3/1994 | Gourdine | 361/697 |

FOREIGN PATENT DOCUMENTS

| | | | |
|---|---|---|---|
| 4220598 | 7/1992 | Japan | 361/695 |
| 5-341874 | 12/1993 | Japan | 361/690 |
| 0930781 | 5/1982 | U.S.S.R. | 361/694 |

*Primary Examiner*—Leo P. Picard
*Attorney, Agent, or Firm*—John B. Sowell; Mark T. Starr; John F. O'Rourke

[57] ABSTRACT

The cooling of a heat generating component mounted outside of the main portion of an enclosure that is cooled using an airstream created by an active air handler is disclosed. The invention is preferably used to cool components such as displays that generate heat, but which are mounted outside the enclosure that houses the main electronics package. The disclosed system, permits inlet air to enter via a vent, and a first duct formed by a baffle routes the inlet air along the back of the displays, removing excess heat. The air is then channeled by a second duct to an area adjacent the enclosure. Since the airstream within the enclosure has created a low pressure area, the passive air stream infiltrates the enclosure and mixes with the main airstream. The disclosed system thus cools the remotely mounted components passively, without requiring additional air handlers or diminishing the pressure and velocity within the enclosure.

9 Claims, 1 Drawing Sheet

PASSIVELY COOLED DISPLAY DOOR

The present invention relates to improvements in cooling systems for computers and electronic equipment, and more particularly relates to improvements in airflow management and related structural components.

BACKGROUND OF THE INVENTION

The displays contained in the front door of a computer cabinet dissipate a significant amount of heat, which causes local deflections in the display cover, thereby creating distortions in the displays. In order to eliminate the distortions, the temperature must be reduced in an amount greater than the reductions achieved through natural convection. However, the addition of an active cooling device such as a fan is not a practical solution due to its high cost relative to the assembly. Additionally, adding a fan has the drawbacks of requiring harnessing and power control, and also produces undesirable acoustic noise. Fan motors also create an electrical field outside the enclosure and additional fans create a safety hazard. Nonetheless, this is one solution disclosed in the prior art. For example, both U.S. Pat. Nos. 4,744,005 and 4,383,286 disclose adding active air handlers to improve the cooling of passively cooled electronics enclosures.

The cooling of enclosures such as computer cabinets is typically achieved using an active air handler to blow air thorough an electronics enclosure, as taught by U.S. Pat. No. 4,291,364. The system described in this patent controls the path of the air through the enclosure to cool the main block of electronics. These systems are generally non-specific in terms of cooling and simply create an air flow through an enclosure. It is also known, however, that air flow can be controlled across a circuit board, as shown in U.S. Pat. Nos. 4,502,100 and 5,263,537. However, the devices cooled in these patents are still within the main air flow stream created by an active air handler. Thus, none of these systems can provide cooling in a particularized location.

Thus, in general, typical cabinet or enclosure is cooled using a single blower located at the top of the cabinet. This blower draws air in the bottom of the cabinet, up through the logic and power, and then exhausts it from the top of the cabinet. This method of cooling results in a situation where a region of low pressure is created in the logic rack, thereby causing air to be drawn into the cabinet through every orifice and opening.

Certain advances have been made, however, in controlling the heat transfer within such systems. For example, U.S. Pat. No. 5,107,398 discloses controlling the air that exits an enclosure by slowing down the velocity of the exit stream and controlling the angle at which the air is discharged. The disclosed system controls flow losses and hot air recirculation to the cabinet, and also controls the main cooling air stream after it has cooled the electronics.

It is also known to provide a so-called "closed loop" system wherein the air blown across the components is recirculated. In such systems, there is no flow into or out of the enclosure, and an active blower moves air throughout the enclosure. A closed loop system that incorporates active cooling through a duct in the enclosure door is disclosed in U.S. Pat. No. 5,150,277. Such systems provide certain energy efficiencies and other benefits, but do not address cooling particular portions of an enclosure that are not directly in the main airflow path.

Finally, enclosures are known that incorporate an airflow that is split into two distinct paths, typically in an attempt to minimize the temperature increase of the air, such as the system disclosed in U.S. Pat. No. 5,136,464. However, in such designs, both air streams are created by active air handlers. A similar system is disclosed in U.S. Pat. No. 5,297,005, which discloses a split system for cooling a circuit that uses a single blower to actively move both parts of the "split" air stream.

It would be desirable to provide a system that could cool components that are located outside the main chambers of an enclosure or that are otherwise outside the main airflow created by an active air handler. It would be further desirable to cool such components without having to split, re-route or otherwise diminish the main airflow stream. Accordingly, it is an object of the present invention to provide cooling to such components in a passive manner, without requiring additional active air handlers. It is a further object of the present invention to provide a design that is easily adapted to both new and existing systems.

SUMMARY OF THE INVENTION

Accordingly, it has now been found that by controlling air infiltration, it is possible to cool the components mounted in a display door or other remote sources of heat. In accordance with the present invention, a portion of the display door is vented to the outside of the cabinet to provide an inlet for ambient air. The air that is drawn in through this vent is then transmitted via a first duct up through the display door before and through a second duct that routes the air adjacent the enclosure. The air is then allowed to infiltrate the interior of the enclosure and is drawn into the logic and power area and through the enclosure by the blower that creates the airstream for the main cabinet cooling air. The present invention thus cools a door mounted display or the like as effectively as a forced convection system without the attendant cost and complexity typically required by such systems. Alternatively, the present invention could be used with a reverse of the described cooling system, in which case air would be exhausted from the logic area and transmitted via a duct to outside the cabinet, through the display door.

In most forced convection enclosures there are air leaks which either cannot be sealed or which cannot be sealed in a cost-effective manner. The present invention takes advantage of these leaks, or points of infiltration, to cool heat generating devices that are mounted in the cabinet, but outside of the main air flow path, e.g., in a display door, and which generate too much heat to cool with natural convection. The present invention thus uses air leakage to cool remotely located components, and does not require the addition of active air movers nor does it reduce the amount of air available to the main electronics area of the cabinet. The present invention is also well-suited for retrofit applications. The duct for routing the inlet air through the door is a simple baffle structure that can be added into many types of existing cabinets.

DETAILED DESCRIPTION OF THE PREFERRED EMBODIMENTS

Figure 1:
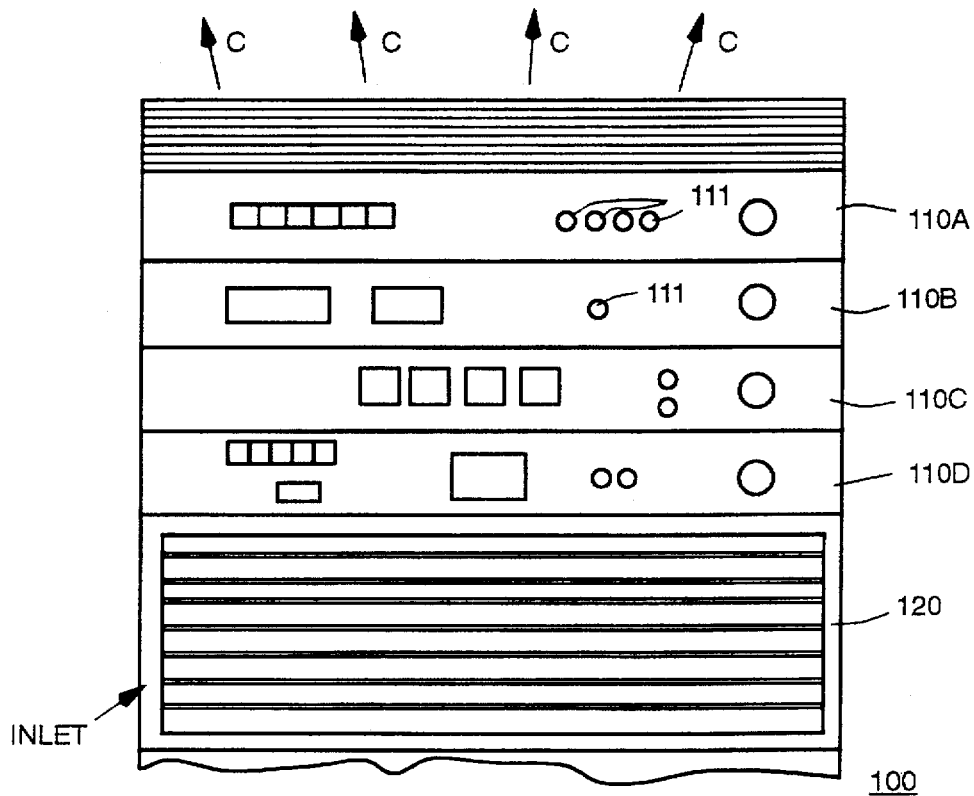
FIG. 1 is a front elevation view, partially broken away, of a system made in accordance with the present invention.

The present invention is preferably applied to enclosures such as the electronics enclosure shown in FIG. 1. It will be understood, however, that the application of the present invention is not limited to computer systems or other electronics enclosures. The present invention, as set forth below, is applicable wherever a remotely located source of heat needs to be cooled and an airflow is available to be routed in manner as described herein. Referring again to FIG. 1, the preferred embodiment illustrated compromises a cabinet or enclosure 100 that houses one or more remote heat generating elements, such as the display panels 110A–D that are illustrated. The display panels 110A–D include heat generating elements such as display lights 111. In certain instances, an entire array of display lights 111 may cover the surface of a panel 110. Such a panel would generate a relatively significant heat load. Because a nearly infinite variety of display panels can be created, the embodiments illustrated as 110A–D are merely representative. For purposes of simplicity, the description set forth below will refer to "display panels 110" in a generic sense.

The display panels 110 together with their associated structure form a display door. In this embodiment, the enclosure 100 contains a fan or other active air handler 145 that draws inlet air through a louvered panel 120 disposed beneath the display panels 110. The air is drawn through the cabinet and exhausts at the top, shown by the arrows designated "C." It will be understood that the relative location of these components can be varied, in other words, the inlet airflow may enter from the top of the cabinet and the exhaust "C" can be at the bottom or at another location. The blower can be located at the top of the cabinet and either pull air upwardly or push air through the cabinet, or the blower can be located at the bottom of the cabinet and push or pull air, depending upon the direction of the rotation of the fan or air handler.

Figure 2:
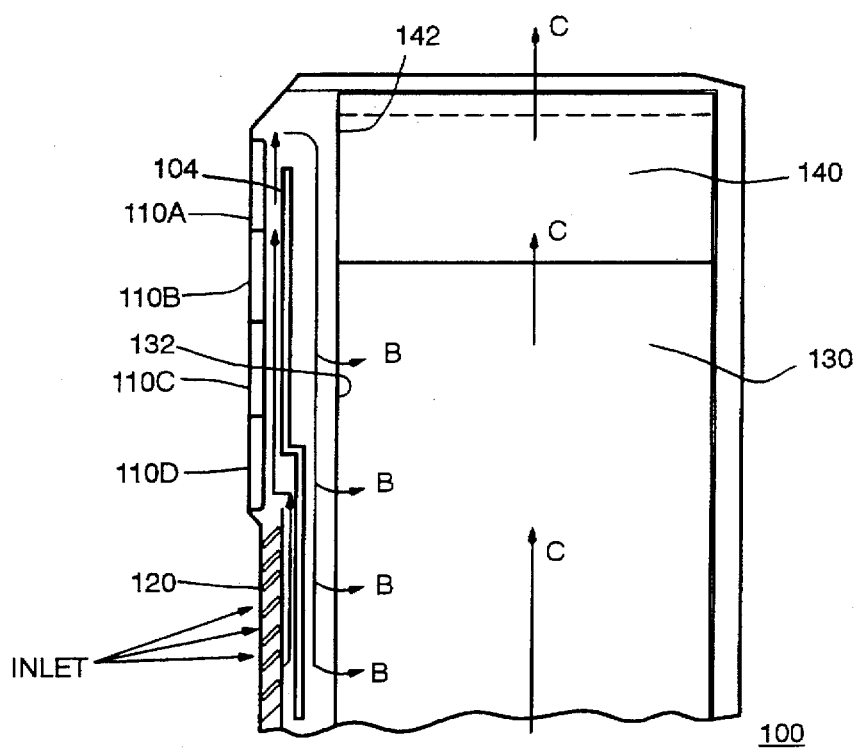
FIG. 2 is a cross-sectional side elevation view of the system illustrated in FIG. 1, illustrating the airflow path through the enclosure.

Referring now to FIG. 2, further details of the present invention are illustrated. In the preferred embodiment illustrated, the enclosure 100 is divided into a main electronics section 130 and a blower section 140. The main electronics section typically includes circuit boards, memory devices, and any of a number of other types of electrical and electronic devices that dissipate heat. For purposes of understanding the present invention, these devices are not shown in FIG. 2. The blower section 140 typically houses a fan or air handler 145 that actively creates the airflow pattern shown by the arrows marked "C" in FIG. 2. As explained above, airflow through a cabinet, such as the linear airflow shown, may be routed to concentrate the flow, and thus the cooling, in certain portions of the electronics section 130.

The cross-sectional view of FIG. 2 illustrates how the display panels 110 are separately and in a spaced relationship from the enclosure walls 132,142 that define, respectively, the electronics section 130 and the blower section 140. In accordance with the present invention, a baffle 104 is disposed between the display panels 110 and the enclosure walls 132,142 as shown. When the baffle plate 104 is in place, the inlet air is first routed upwardly through the narrow channel between the baffle plate 104 and the rear of the display panels 110. As the relatively cooler and moving inlet air passes over these surfaces, convective heat transfer dissipates the heat generated by the displays and cools the display panels 110, thereby reducing or eliminating the distortions described above.

After the airflow has passed in front of and/or behind the display panels 110 it follows the illustrated path and is forced between the baffle plate 104 and the enclosure walls 132,142. As explained above, these walls 132,142 permit infiltration, as shown by the arrows marked "B" and this infiltrated air mixes with the active flow "C" induced by the air handler disposed in or connected to the blower section 140.

It will be appreciated that the airflow "B" that enters from the inlet and flows into the electronics section 130 is passively induced by the existing cooling and airflow apparatus. Although the air flowing over the display panels 110 will have absorbed heat and will have a higher temperature than air infiltrating from the ambient environment, those skilled in the art will either be able to determine that the existing system can absorb and discharge the additional heat, or can determine that the blower section 140 and associated components needs to be modified, for example, it may be necessary to increase the airflow velocity. However, it is known in the art that most cabinet cooling systems have excess capacity, and the addition of the small amount of heat dissipated by the display panels to this load will in most instances have no effect upon the operating parameters of the cooling system.

As seen in FIG. 2, it is preferred that the baffle 104 be disposed between the display panels 110 and the enclosure walls 132,142 and thus defines a first duct that provides flow against the display panels 110 and a second duct that provides flow against the enclosure walls 132,142 to permit infiltration. Most preferably, the baffle 104 has an offset bend such that the upper section of the first duct forces the air closer to the display panels 110, while the lower section of the second duct forces the air to infiltrate by reducing the cross-sectional area in this region, thereby increasing velocity and pressure. As known in the art, the ducts, baffles and other structures disclosed herein may be comprised of sheet metal, such as aluminum or stainless steel, or may be created from plastics, paper products or composite materials such as fiberglass.

From the foregoing, it will be appreciated that the present invention does not require an additional fan or active air handler, and cools electronic packages (heat sources) that are outside the primary section of an enclosure, such as the main logic area, by controlling leakage to create a secondary air stream. Unlike the "closed loop" systems described above, the present invention permits air flow into and out of the enclosure, and in particular routes a portion of the airflow through a space outside the main compartment of the enclosure. In the present invention, air therefore flows in two different airflow paths, namely, the main compartment and through the space between the display panels and the enclosure structure. Moreover, the present invention does not require a "split" from the main airflow created by an air handler, and therefore does not significantly alter the volume or velocity of the air stream. The heated air from the secondary air stream goes into the main logic area after it has passed over the remotely located heat source.

In this regard, the present invention uses "unused air" to cool additional components. The leakage air that is used for cooling in the present invention is air that is not typically used to cool the main logic area, but is instead air that would leak into or out of this portion of the enclosure. The prior art "split path" systems described above simply divert a portion of the main air stream to cool individual components. However, it will be appreciated by those skilled in the art that such diversion reduces the amount of air available within the main compartment and thus effects the cooling capacity by altering one or both of the pressure and velocity of the air. In the present invention, the two air flow paths are not "split" since they are not isolated and the air flowing through the display panel 110 or other remote section eventually leaks into the main compartment. As described above, the separate flow is created by providing a second inlet for the secondary air flow.

Although certain embodiments of the present invention have been described above with particularity, these embodiments are meant to illustrate the invention and are not meant to limit its scope. Upon review of the foregoing specification, those of skill in the art will realize many adaptations, modifications and variation of the components described above that utilize the present invention while departing from the specific design illustrated. For example, as noted above, there are numerous ways in which the airflow patterns disclosed herein can be varied in terms of direction and point of entry and exit. Additionally, there are numerous other types of cabinets which have different geometries than the preferred embodiment described above, but which nonetheless can readily take advantage of the present invention to provide a cooling flow in a location outside the main airflow stream that exists within the cabinet. Thus, reference should be made to the appended claims in order to ascertain the full scope of the present invention.

What is claimed is:

1. An enclosure and a display door containing sources of heat, said display door being mounted to the enclosure, the door comprising: (a) an inlet in the display door for admitting cooling air, (b), a first duct defined by the display door, and (c) a baffle, wherein the first duct is in fluid communication with a second duct, the second duct defined by the baffle and the enclosure, wherein air within the second duct infiltrates the enclosure.

2. The enclosure of claim 1, further comprising an electronics section and an active air handler comprising a blower section, wherein the blower section is disposed on top of the electronics section.

3. The enclosure of claim 1, wherein the inlet comprises a louvered panel disposed so as to admit an airflow to the first duct.

4. The enclosure of claim 1, wherein the baffle comprises a single panel connected to and disposed between the display door and the enclosure.

5. The enclosure of claim 1, wherein the display door comprises a plurality of sources of heat.

6. The enclosure of claim 4, wherein the single panel is comprised of sheet metal.

7. The enclosure of claim 1, wherein the display door and the enclosure define substantially parallel walls, and wherein the baffle is disposed between the parallel walls and includes an offset bend, whereby a first portion of the first duct is larger than a second portion of the first duct.

8. A method of cooling a source of heat disposed within a panel that is mounted on a door of an enclosure, comprising the steps of:

admitting air into the panel through an inlet into a first duct disposed adjacent the source of heat and within the display panel; directing airflow through the first duct into a second duct disposed between the panel and the enclosure;

allowing airflow from the second duct to infiltrate the enclosure and mix with the airstream; and exhausting the airflow and airstream from the enclosure in a common stream.

9. The method of claim 8, further comprising the step of installing a baffle in an existing panel to define the first and second ducts.

* * * * *